D. B. LILLARD.
FIFTH WHEEL FOR BUGGIES.
APPLICATION FILED OCT. 13, 1913.
1,092,371.
Patented Apr. 7, 1914.
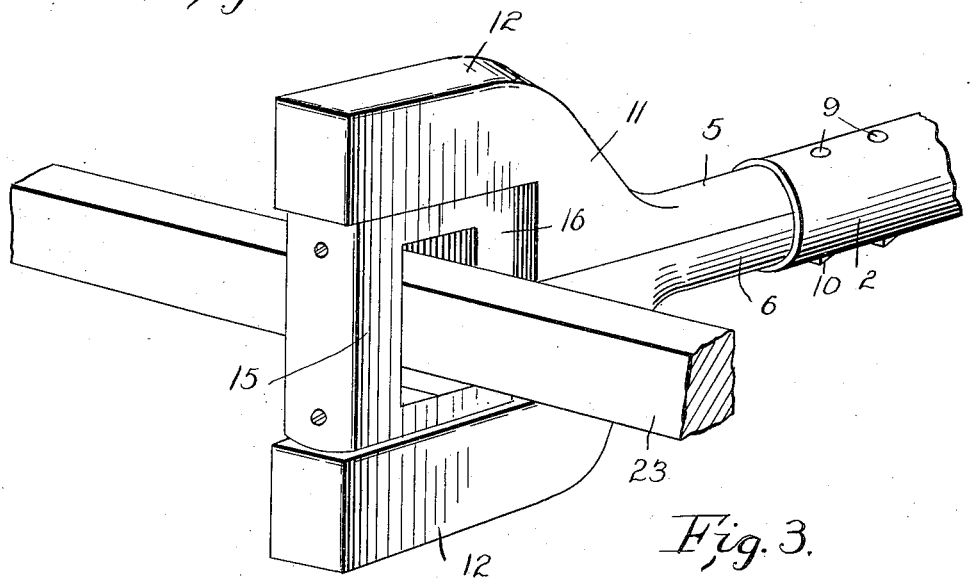
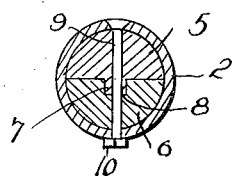
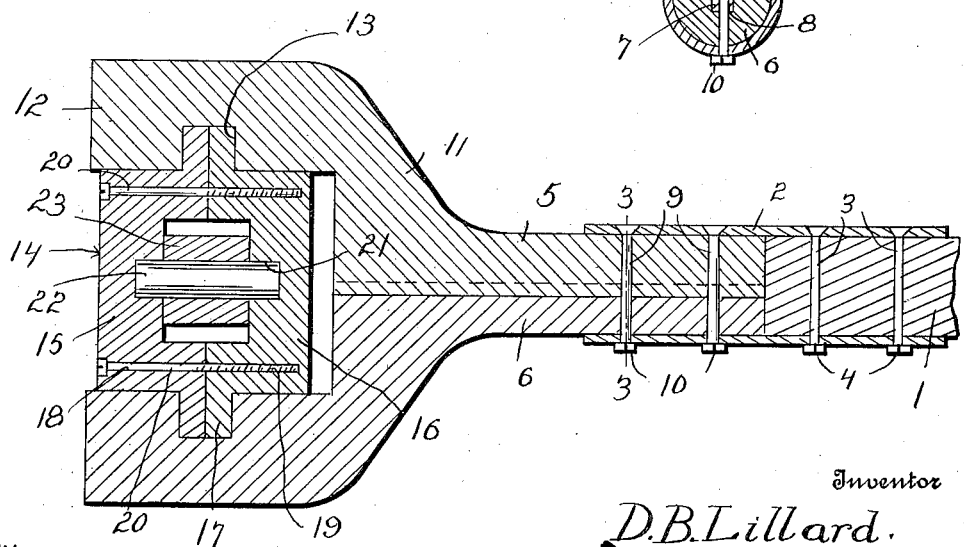
Witnesses
R. N. Jones.
H. Hays Martin.
Inventor
D. B. Lillard.
By ............ Jr.
Attorney

UNITED STATES PATENT OFFICE.

DAVID BRITTON LILLARD, OF ELKMONT, ALABAMA.

FIFTH-WHEEL FOR BUGGIES.

1,092,371. Specification of Letters Patent. Patented Apr. 7, 1914.

Application filed October 13, 1913. Serial No. 794,927.

*To all whom it may concern:*

Be it known that I, DAVID B. LILLARD, a citizen of the United States, residing at Elkmont, in the county of Limestone and State of Alabama, have invented certain new and useful Improvements in Fifth-Wheels for Buggies; and I do hereby declare the following to be a full, clear, and exact description of the invention, such as will enable others skilled in the art to which it appertains to make and use the same.

This invention relates to new and useful improvements in fifth wheels for buggies and has for its object the provision of such a device which will eliminate the danger of breaking which usually accompanies the fifth wheel of the ordinary type.

Another object of my invention is the provision of a device of the above character which will permit the front axle to oscillate and rock with relation to inaccuracies in the road way without causing shocks to the vehicle.

A still further object of my invention is the provision of a device which will be simple, strong and durable, and which, should any part become lost or broken be easily and quickly replaced without the necessity of obtaining the services of a blacksmith or wheelwright.

With the above and other objects in view I now proceed to describe my invention in the following specification, and accompanying drawings, in which, Figure 1 is a perspective view of my improved fifth wheel, Fig. 2 is a longitudinal sectional view of Fig. 1, and Fig. 3 is a transverse sectional view taken on the line 3—3 of Fig. 2.

Referring to the drawings by characters of reference 1 indicates a buggy reach having secured thereto a sleeve 2 by means of the bolts 3 and nuts 4.

My improved fifth wheel preferably comprises the two coacting members 5 and 6, the member 5 being preferably provided with a longitudinally extending tongue 7 which is adapted to extend through a longitudinally extending groove 8 in the coacting member 6. Adjacent the inner ends of the two members 5 and 6 I preferably provide the registering apertures through which the connecting bolts 9 are adapted to extend. These connecting bolts pass through apertures in the sleeves 2 and the apertures in the coacting members 5 and 6, respectively, and are provided at their lower extremities with the nuts 10. The ends of the coacting members 5 and 6 opposite the sleeve end are extended as clearly shown and formed with the upstanding members 11, which terminate in the angularly extending portions 12. Intermediate the ends of the angularly extending portions 12 I preferably provide the circular recesses 13 as will be clearly seen upon referring to Fig. 2.

A suitable link member, indicated generally by the numeral 14, preferably comprises the two members 15 and 16. These members 15 and 16 are preferably made in the form of U-shaped members and when in position form a complete link having the cylindrical outstanding members 17 coöperating therewith which are adapted to enter the recesses 13 formed in the members 5 and 6, respectively. The member 15 is preferably provided with the transversely extending apertures 18 which are adapted to register with the internally screw threaded apertures 19 in the member 16. Thus, it will be seen that when it is desired to secure these members together a bolt 20 may be passed through the apertures 18 and into the threaded apertures 19, thereby securely holding the same in position. Intermediate the longitudinal extremities of the members 15 and 16 I preferably provide the cylindrical recesses 21 which are adapted to coöperate with a suitable cylindrical pin 22, extending transversely through the axle of a vehicle indicated by the numeral 23.

It will be seen that when it is desired to make use of my improved fifth wheel the axle is placed in position in the link 14 and the screws 20 tightened. This much of the device is then placed between the portions 12 formed on the members 5 and 6 with the cylindrical portion 17 entering the recesses 13. The sleeve 2 is then placed in position on the fifth wheel and secured to the buggy reach with the bolts extending therethrough, thus forming a rigid connection between the fifth wheel and the buggy reach and eliminating the danger of breaking.

While in the foregoing I have shown and described the preferred embodiment of my invention, I wish it to be understood that I may change the specific arrangements of parts without in any way departing from the spirit and scope of my invention.

What I claim is:—

A device of the character described comprising two coacting members forming a U-shaped member, one of said coacting members having a longitudinal groove extending throughout a portion of its length, a longitudinally extending rib formed integral with the other coacting member, said longitudinally extending rib being adapted to extend into the groove, a link pivotally mounted between the arms of the U-shaped member, and an axle pivotally mounted in the link.

In testimony whereof I affix my signature in presence of two witnesses.

DAVID BRITTON LILLARD.

Witnesses:
L. A. GRAY,
W. A. McCONNEL.

Copies of this patent may be obtained for five cents each, by addressing the "Commissioner of Patents, Washington, D. C."